Patented Aug. 19, 1941

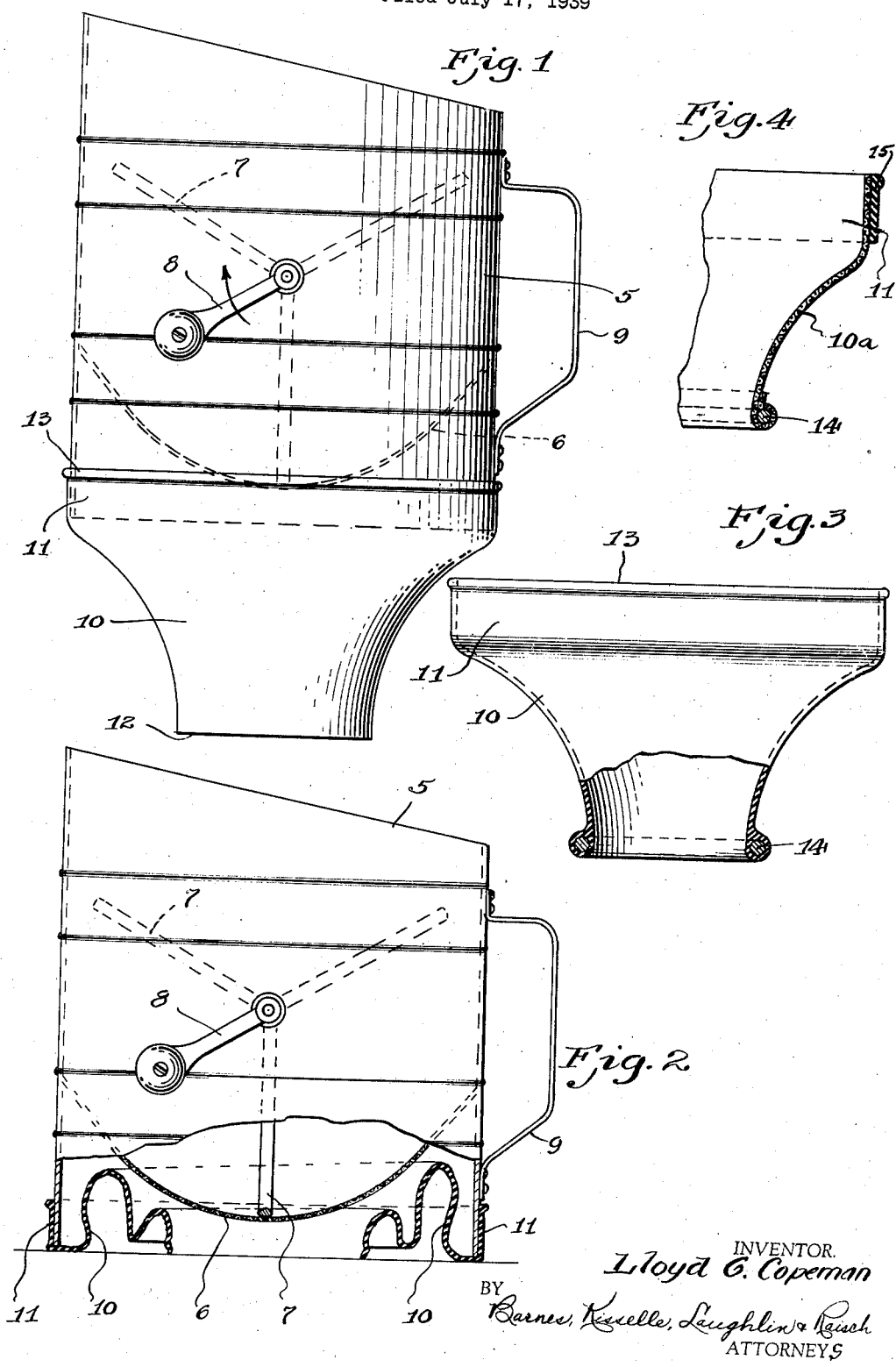

2,252,701

UNITED STATES PATENT OFFICE 2,252,701

FLOUR SIFTER COMBINATION

Lloyd G. Copeman, Flint, Mich.

Application July 17, 1939, Serial No. 284,843

3 Claims. (Cl. 209—255)

This invention relates to a flour sifter combination.

The usual type of flour sifter used by housewives consists of a tubular sheet metal piece open at both ends and provided with a screen sieve located between the ends and a movable member adapted to pass over the sieve to sift flour. On some occasions it is desirable that the sifted flour be directed to a relatively small area and since the flour sifters normally have a large opening it is impossible to so direct the flour without waisting a considerable quantity. The reason for sifting flour is, of course, to render it light and fluffy. With the present type of sifter it is necessary to sift the flour into a large dish and spoon it into a measuring cup. This tends to pack the flour again.

Attempts have been made to solve this problem by furnishing removable metal funnels adapted to be fastened to the lower end of the flour sifter, these funnels having a small discharge opening. The difficulty with this solution has been that the flour sifter could not be set down in an upright position conveniently without danger of overturning and also the metal funnel formation was an expensive addition to the relatively inexpensive utensil.

The present invention contemplates a discharge element for a flour sifter which is adapted to direct the sifted flour where desired and which permits normal use of the flour sifter with no inconvenience. Another feature of the invention is that the discharge element which is contemplated is an inexpensive device which may be manufactured at a relatively low cost. It is a further object of the invention to provide a flour directing device which may fit various sized sifters and which will fold into the sifter when not in use.

Other objects of the invention will be apparent in the course of the following description.

In the drawing:

Fig. 1 is an illustration of the combination of a flour sifter and the discharge element of the type contemplated by the present invention.

Fig. 2 illustrates a flour sifter resting on a flat surface with the discharge element folded into the lower opening of the sifter.

Fig. 3 is a side elevation of a modified type of discharge element.

Fig. 4 is a partial section of a discharge element formed of fabric.

Referring to the drawing, it will be seen that a standard flour sifter is illustrated at 5, this sifter being a tubular member open at both ends and provided with a sifting screen 6 located near the bottom opening. A movable sifting element 7 is rotatably mounted in the sifter and adapted to be moved by a handle 18. A handle 9 permits convenient use of the sifter. On the bottom of the sifter, as illustrated in Fig. 1, is a tubular shaped discharge element 10 having a large top 11 and a small bottom 12. This discharge element is open at both ends and the top part is adapted to be fastened to the lower end of the sifter. In the embodiment shown, this discharge element is fastened to the sifter by having the top portion stretched over the lower end of the sifter and frictionally held thereon. The top edge of the discharge element 10 is preferably reinforced to make it slightly more resilient than the remaining portions of the element and to prevent tearing.

The discharge element is preferably made of a material having sufficient flexibility that the entire element will fold into the lower end of the sifter, as shown in Fig. 2, and having sufficient resiliency that when the sifter is lifted from the flat surface upon which it normally rests, the discharge element will spring into the position shown in Fig. 1. This flexible material may be formed of sheet rubber or a rubberized fabric. In Fig. 3 the lower opening of the element is shown with an embedded weight ring 14.

Another modification of the invention shown in Fig. 4 comprises a flexible, but non-resilient, discharge element 10a which is weighted at 14 so that the lower end will fall from the sifter when the sifter is lifted. An elastic band 15 is inserted in the flexible material to hold the discharge element on the sifting device. Each of the embodiments of the invention are arranged to fit sifters of various makes and dimensions because of their flexible connection with the sifter. In the embodiment shown in Fig. 1, it will be seen that since the lower restricted end of the member 12 is also stretchable, it may be fitted over the end of a receiving container such as a measuring cup or the like, if such is desired.

What I claim is:

1. In combination with a flour sifter comprising an open ended casing, a sifting screen spaced from the bottom thereof, a directing device to be used therewith comprising a tubular section of flexible material having one end adapted to telescope over and resiliently engage the discharge end of the flour sifter casing, and the other end formed smaller and adapted to serve as a discharge opening, said flexible material being sufficiently resilient that it will fold into the lower end of said sifter when the sifter is resting on a surface, and it will spring into funnel shape below said sifter when said sifter is lifted from said surface.

2. In combination with a flour sifter of the type formed of a tubular metal piece open at the top and bottom and provided with a sieve piece spaced between the openings, a removable discharge element to be used therewith comprising a thin rubber tubular section having one large end adapted to fasten to the bottom of said sifter and a smaller end to serve as a directing opening, said element being adapted to fold into said sifter when the same is resting on a surface and to spring into a funnel shape when the sifter is lifted from the surface.

3. In combination with a flour sifter comprising an open ended casing, a discharge element to be used therewith comprising a tubular section of relatively thin rubber having a large, reinforced end adapted to stretch over and frictionally engage the normal sifter opening of the casing, said tubular section having a smaller end opposed to said reinforced end for directing sifted flour, said rubber being sufficiently flexible that it will fold into said sifter when not in use and being sufficiently resilient that it will spring into a funnel shape when used.

LLOYD G. COPEMAN.